United States Patent
Reading et al.

(10) Patent No.: US 8,431,095 B2
(45) Date of Patent: Apr. 30, 2013

(54) CATALYTIC REACTOR

(75) Inventors: Anthony Henry Reading, Abingdon (GB); Ian Kenneth Baxter, Abingdon (GB); Michael Joseph Bowe, Abingdon (GB)

(73) Assignee: CompactGTL plc, Abington, Oxfordshire (GB)

( * ) Notice: Subject to any disclaimer, the term of this patent is extended or adjusted under 35 U.S.C. 154(b) by 144 days.

(21) Appl. No.: 13/122,669

(22) PCT Filed: Oct. 21, 2009

(86) PCT No.: PCT/GB2009/051416
§ 371 (c)(1),
(2), (4) Date: Apr. 5, 2011

(87) PCT Pub. No.: WO2010/046701
PCT Pub. Date: Apr. 29, 2010

(65) Prior Publication Data
US 2011/0194997 A1    Aug. 11, 2011

(30) Foreign Application Priority Data
Oct. 24, 2008   (GB) .................................. 0819519.0

(51) Int. Cl.
*B01J 8/00*    (2006.01)
*B01J 10/00*   (2006.01)

(52) U.S. Cl.
USPC ........... 422/602; 422/600; 422/601; 422/211; 422/222

(58) Field of Classification Search .................. 422/600, 422/601, 602, 211, 222
See application file for complete search history.

(56) References Cited

U.S. PATENT DOCUMENTS
7,235,218 B2 *  6/2007  Bowe ............................ 422/211

FOREIGN PATENT DOCUMENTS
| GB | 2354960 A | 4/2001 |
| WO | 03033131 A1 | 4/2003 |
| WO | 03033134 A1 | 4/2003 |

OTHER PUBLICATIONS
International Search Report and Written Opinion for PCT/GB2009/051416 dated Jan. 29, 2010.

* cited by examiner

*Primary Examiner* — Walter D Griffin
*Assistant Examiner* — Lessanework Seifu
(74) *Attorney, Agent, or Firm* — Iona N. Kaiser; McDermott Will & Emery LLP

(57) ABSTRACT

A compact catalytic reactor defines a multiplicity of first and second flow channels arranged alternately, for an endothermic reaction and for an exothermic reaction respectively, and each containing a removable fluid-permeable catalytic insert to catalyze the reaction. The flow channels have a straight portion extending from one end face of the reactor and a linking portion that communicates between the end of the straight portion and at least one side face of the reactor, wherein the straight portion and the linking portion are defined at least in part by fin structures. The fin structures of the linking portion may be perforated, so that there are perforations aligned with each straight portion, but at the end of the reactor each line of perforations is obstructed. Removal of the obstructions enables the catalytic inserts to be pushed out of the flow channels when they are spent.

15 Claims, 3 Drawing Sheets

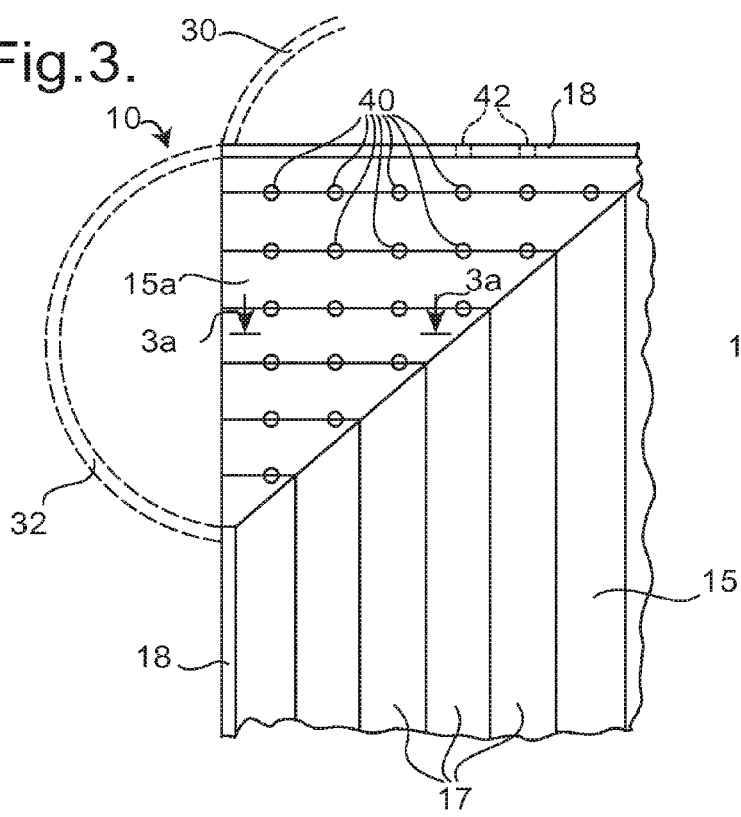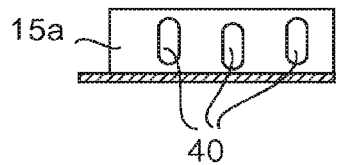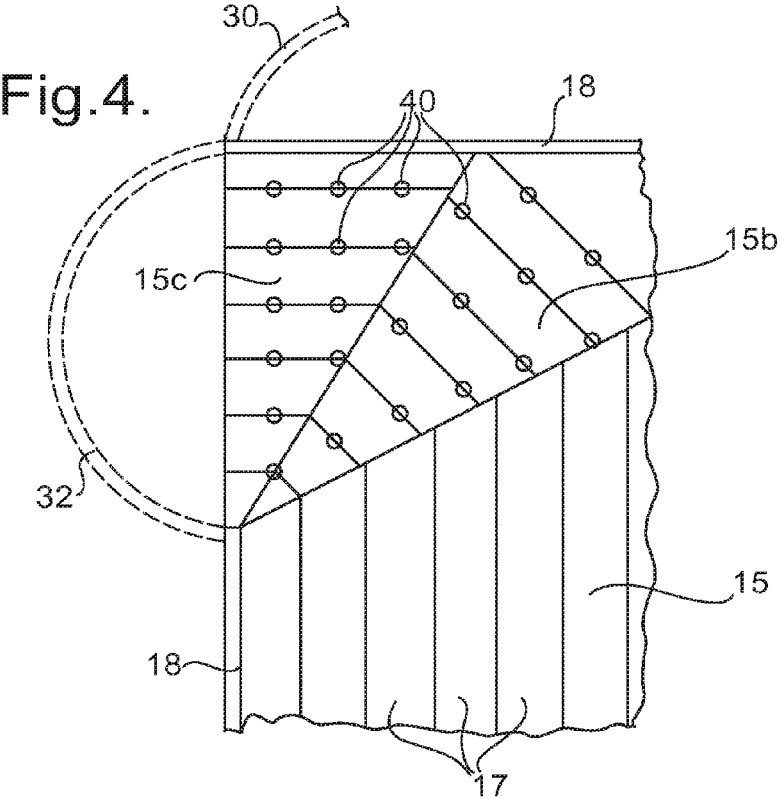

CATALYTIC REACTOR

CROSS-REFERENCE TO RELATED APPLICATION

This application is a continuation of PCT Application No. PCT/GB2009/051416, filed Oct. 21, 2009 and claiming priority to GB Application No. 0819519.0 filed Oct. 24, 2008, the disclosure of which is incorporated herein by reference in its entirety.

This invention relates to a catalytic reactor for performing at least two chemical reactions, particularly an exothermic reaction and an endothermic reaction.

A plant and process are described in WO 2005/102511 (GTL Microsystems AG) in which methane is reacted with steam, to generate carbon monoxide and hydrogen in a first catalytic reactor; the resulting gas mixture is then used to perform Fischer-Tropsch synthesis in a second catalytic reactor. The reforming reaction, which is endothermic, is typically carried out at a temperature of about 800° C., and the heat required may be provided by catalytic combustion in channels adjacent to those in which reforming is carried out, the combustion channels containing a catalyst which may comprise palladium or palladium/platinum on an alumina support in the form of a thin coating on a metallic substrate.

In order for the reaction to take place efficiently it is important to ensure good contact between the catalyst and the reactants. In order to facilitate this level of contact the catalyst may be provided on one or more foils that can be provided within each of the reaction channels. The foils subdivide the channels and ensure that the catalyst is brought into close contact with the reagents. Furthermore, the efficiency of the reactor will be dictated by the efficiency of the heat transfer between the combustion channels and the steam methane reforming channels. In order to avoid runaway reactions it is important that the temperature profiles of the combustion and reforming channels complement one another. However, the logistics of achieving this are non-trivial. The lifetime of a reactor is dictated by the lifetime of the least long-lived part and this is often the catalyst. The provision of catalyst on a foil provides the advantage that the foil can be replaced, thereby allowing the overall reactor lifespan to be extended. However, the extraction of the catalyst bearing foils may be non-trivial as a result of the reactor configuration.

It is against this background that the present invention has been devised in order to mitigate some or all of the above mentioned problems.

According to the present invention there is provided a compact catalytic reactor, the reactor defining a multiplicity of first and second flow channels arranged alternately, the first flow channels providing flow paths for reactants for an endothermic reaction and containing a removable fluid-permeable catalytic insert to catalyze the endothermic reaction, and the second flow channels providing flow paths for reactants for an exothermic reaction and containing a removable fluid-permeable catalytic insert to catalyze the exothermic reaction, wherein the first flow channels have a straight portion extending from one end face of the reactor and a linking portion that communicates between the end of the straight portion and at least one side face of the reactor, wherein the straight portion and the linking portion are defined at least in part by fin structures, and wherein the fin structures of the linking portion are perforated, so that there are perforations that define a path aligned with each straight portion, and means are provided at the end of the reactor to obstruct each such path.

Preferably the second flow channels similarly have a straight portion extending from the opposite end face of the reactor, and a linking portion that communicates between the end of the straight portion and at least one side face of the reactor, wherein the straight portion and the linking portion are defined by fin structures, and wherein the fin structures of the linking portion are perforated, so that there are perforations that define a path aligned with each straight portion; and means are provided at the end of the reactor to obstruct each such path.

When inserting catalyst inserts into the flow channels, these can readily be inserted along the straight portions. When a catalyst becomes spent, and it is desired to remove the catalyst inserts, after the obstruction means have been removed the perforations enable the catalyst inserts to be pushed out of the flow channels along the straight portions, using a suitable push rod. The perforations preferably are at least 75% of the height of the fin structure, so that the push rod can be large enough to push against at least 75% of the height of the catalyst insert.

The reactor may comprise a stack of plates, and in particular the flow channels may be defined by thin metal sheets that are castellated and stacked alternately with flat sheets, while the edges of the flow channels may be defined by sealing strips. To ensure the required good thermal contact both the first and the second gas flow channels may be between 10 mm and 2 mm deep, preferably less than 6 mm deep, more preferably in the range 3 mm to 5 mm. The stack of plates forming the reactor module is bonded together for example by diffusion bonding, brazing, or hot isostatic pressing.

The catalyst insert preferably has a metal substrate to provide strength and to enhance thermal transfer by conduction, so preventing hotspots. Typically the metal substrate would be covered with a ceramic coating into which active catalytic material is incorporated. Preferably the metal substrate for the catalyst inserts is a steel alloy that forms an adherent surface coating of aluminum oxide when heated, for example an aluminum-bearing ferritic steel (e.g. Fecralloy™). When this metal is heated in air it forms an adherent oxide coating of alumina, which protects the alloy against further oxidation and against corrosion. Where the ceramic coating is of alumina, this appears to bond to the oxide coating on the surface. Preferably each catalyst insert is shaped so as to subdivide the flow channel into a multiplicity of parallel flow sub-channels, with catalytic material on surfaces within each such sub-channel. The substrate may be a foil, a wire mesh or a felt sheet, which may be corrugated, dimpled or pleated; the preferred substrate is a thin metal foil for example of thickness less than 100 μm, which is corrugated, or a stack of corrugated and flat foils. Such a material is liable to tear, so that pulling the catalyst structure out of the channel is impractical.

The invention will now be further and more particularly described, by way of example only, and with reference to the accompanying drawings, in which:

FIG. 3 shows a plan view of part of the reactor block of FIG. 1 during assembly;

FIG. 3a shows a view on the line 3a-3a of FIG. 3;

FIG. 4 shows a plan view of a modification to the reactor block shown in FIG. 3.

The steam reforming reaction is brought about by mixing steam and methane, and contacting the mixture with a suitable catalyst at an elevated temperature so the steam and methane react to form carbon monoxide and hydrogen. The steam reforming reaction is endothermic, and the heat may be provided by catalytic combustion, for example of hydrocarbons and/or hydrogen mixed with air, so combustion takes place over a combustion catalyst within adjacent flow channels within the reforming reactor.

Figure 1:
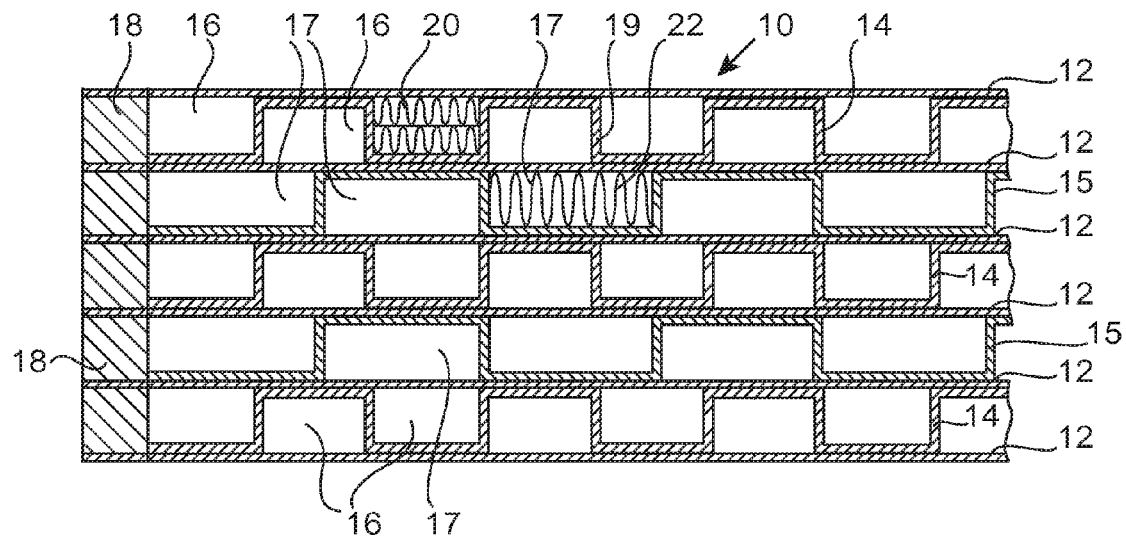
FIG. 1 shows a sectional view of part of a reactor block suitable for steam/methane reforming, with the parts shown separated for clarity (this section being on the line 1-1 of FIG. 2)

Referring now to FIG. 1 there is shown a reactor 10 suitable for use as a steam reforming reactor, defining channels for a catalytic combustion process and channels for steam methane reforming. The reactor 10 consists of a stack of plates that are rectangular in plan view, each plate being of corrosion resistant high-temperature alloy such as Inconel 625, Incoloy 800HT or Haynes HR-120. Flat plates 12, typically of thickness in the range 0.5 to 4 mm, in this case 1 mm thick, are arranged alternately with castellated plates 14 or 15, so the castellations define channels 16 or 17. The castellated plates 14 and 15 are arranged in the stack alternately. The thickness of the castellated plates 14 and 15, typically in the range between 0.2 and 3.5 mm, is in each case 0.75 mm. The height of the castellations, typically in the range 2-10 mm, is 4 mm in this example, and solid bars 18 of the same thickness are provided along the sides. In the castellated plates 15 which define the combustion channels 17 the wavelength of the castellations is such that successive fins or ligaments are 25 mm apart, while in the castellated plates 14 which define the reforming channels 16 successive fins are 15 mm apart. The castellated plates 14 and 15 may be referred to as fin structures.

The stack of plates would be assembled and bonded together typically by diffusion bonding, brazing, or hot isostatic pressing. Into each of the channels 16 and 17 is then inserted a respective catalytic insert 20 or 22 (only one of each are shown in FIG. 1), carrying a catalyst for the respective reaction. These inserts 20 and 22 preferably have a metal substrate and a ceramic coating acting as a support for the active catalytic material, and the metal substrate may be a thin metal foil. For example they may comprise a stack 20 of corrugated foils and flat foils, or a single corrugated foil 22, occupying the respective flow channel 16 or 17, each foil being of thickness less than 0.1 mm, for example 50 μm.

Figure 2:
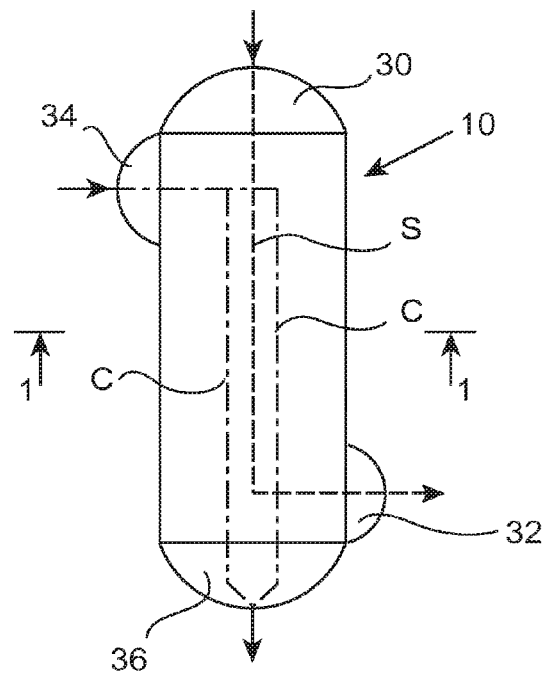
FIG. 2 shows a plan view of the assembled reactor block of FIG. 1 showing the flow paths.

Referring now to FIG. 2 there is shown a plan view of the assembled reactor 10. The gas mixture undergoing the steam reforming reaction enters a header 30 at one end of the reactor 10 (top, as shown) and follows flow channels 16 that extend straight along most of the length of the reactor 10. Towards the other end of the reactor 10 the flow channels 16 change direction through 90° to connect to a header 32 at the side of the other end of the reactor 10 (bottom right as shown), this flow path being shown as a broken line S. The gas mixture that is to undergo combustion enters a header 34 at the side of the one end of the reactor 10 (top left, as shown), then changes direction through 90° to flow through flow channels 17 that extend straight along most of the length of the reactor 10, to emerge through a header 36 at the other end (bottom, as shown), this flow path being shown as a chain dotted line C. The arrangement is therefore such that the flows are co-current; and is such that each of the flow channels 16 and 17 is straight along most of it length, and communicates with a header 30 or 36 at an end of the reactor 10, so that the catalyst inserts 20 and 22 can be readily inserted before the headers 30 or 36 are attached. It may be preferable to provide catalyst inserts 20 and 22 only along those parts of the straight portions of the flow channel 16 and 17 that are adjacent to each other.

Referring now to FIG. 3 there is shown a plan view of a portion of the reactor 10 during assembly, showing the castellated plate 15 in the vicinity of one end (the top end, as shown in FIGS. 2 and 3). This end of the castellated plate 15 is cut at an angle of 45°, and a linking portion 15a of castellated plate with one end cut square and the other end cut at an angle of 45° is butted up against it. After completion of the assembly and attachment of the headers 30 and 32 (shown in broken lines in FIG. 3) the linking portion 15a ensures that the gas mixture flowing in to the header 32 turns through 90° to flow along the channels 17 along the length of the reactor 10, as indicated above by the chain dotted lines C in FIG. 2.

It will be appreciated that many other arrangements of portions of castellated plates may be used to achieve this change of gas flow direction. For example as shown in FIG. 4 there may be two triangular portions of castellated plate 15b and 15c that bring about the change of flow direction. Alternatively the end of the castellated plate 15 might be cut square, and a linking portion (not shown) inserted that provides castellations following arcs, although this would require specially formed arcuate castellations. It will be appreciated that the castellated plate linking portions 15a or 15b and 15c ensure that the successive flat plates 12 can be firmly compressed during the bonding process when forming the reactor 10. The fins of the castellated plates forming these linking portions 15a or 15b and 15c bring about the change of gas flow direction. In another modification not shown in the accompanying figures there are two inlet headers 34 at the same end of the reactor 10, one on either side of the reactor 10, and there are two linking portions arranged as mirror images and respectively communicating with the left-hand half and the right-hand half of the castellated plate 15, so that half the gas flow is supplied through one header 34 and the other half of the gas flow is supplied through the header on the opposite side.

The description here has explained how the change of flow direction for the combustion flow path C is brought about. The change of direction of the flow path S for the steam methane reforming gas mixture at the other end of the reactor 10 is brought about by an equivalent arrangement of linking portions of castellated plate.

Whatever the arrangement of the linking portions, the fins of the linking portions 15a or 15b and 15c of castellated plate are provided with perforations that are substantially aligned with the straight portions of channel 17 in the castellated plate 15. Each perforation 40 must be sufficiently large and suitably sized to allow a plunger or pushing rod (described in relation to FIG. 5) to gain access to the channels 17. For example, each perforation may be slot-shaped, extending almost the entire height of the fin, and their locations are indicated by small circles in FIGS. 3 and 4, although it will be appreciated that they are not visible in this plan view. As shown in FIG. 3a, which shows part of the linking portion 15a on the section line 3a-3a, the perforations 40 extend most of the height of the fin; although they may all be positioned at the same height, in this example they are alternately centered above and below the centerline of the fin because, as is evident from FIG. 1, the centers of adjacent channels 17 differ in height owing to the thickness of the castellated plate 15. In this example they are shown as being taller than they are wide, but in an alternative they may be circular, rectangular or any other shape providing it enables suitable access to the channels 17, without having a detrimental effect on the strength of the reactor. A similar arrangement of perforations is provided in the linking portions of castellated plate that bring about the change of direction of the steam methane reforming gas mixture from the flow channels 16. It will be appreciated that the perforations 40 do not have a significant effect on the gas flow, as the pressures are substantially equal in all the parallel flow channels, and the paths defined by the lines of aligned perforations are obstructed at the end of the reactor by the bar 18.

When it is necessary to remove catalytic inserts 20 and 22 from the flow channels 16 and 17 for example because the catalyst is spent, this can be achieved by removing the headers 30 and 36 from the reactor 10, and drilling holes 42 (two of which are indicated in broken lines) through all the bars 18 at the ends of the reactor 10, in line with the perforations 40. A plunger can then be inserted through the drilled holes 42 and through the perforations 40 to push the catalytic inserts 20 or 22 out of the flow channels 16 or 17. The catalytic inserts 20 and 22 are only in the straight portions of flow channel, and can therefore be readily pushed out. Because the catalytic inserts 20 and 22 are closely matched in size to the channels 17 and made of thin foils, removing them by pushing them out is a much more reliable process than attempting to pull them out. It will be appreciated that it is then only necessary to block the holes 42 in the bars 18, and the reactor 10 is ready for insertion of new catalytic inserts 20 and 22. The closure of the holes 42 may be achieved by inserting plugs into the drilled holes 42 and welding or brazing them in place. Alternatively a metal strip may be fixed to the outside of the bar 18 to block all the drilled holes. As another alternative the bars 18 at the ends of the reactor 10 may be provided with such holes 42 initially, aligned with the perforations 40, and with a metal strip fixed to the outside of the bar 18 to block the holes 42. In this case it is only necessary to machine off the metal strip, and the plunger can then be inserted to push out the catalytic inserts.

The same arrangement of perforations in the fin structure of the linking portions is provided for the channels 16 carrying the steam methane reforming gas mixture, at the other end of the reactor 10, so the reforming catalyst catalytic inserts 20 can be pushed out in the same way.

Figure 5:
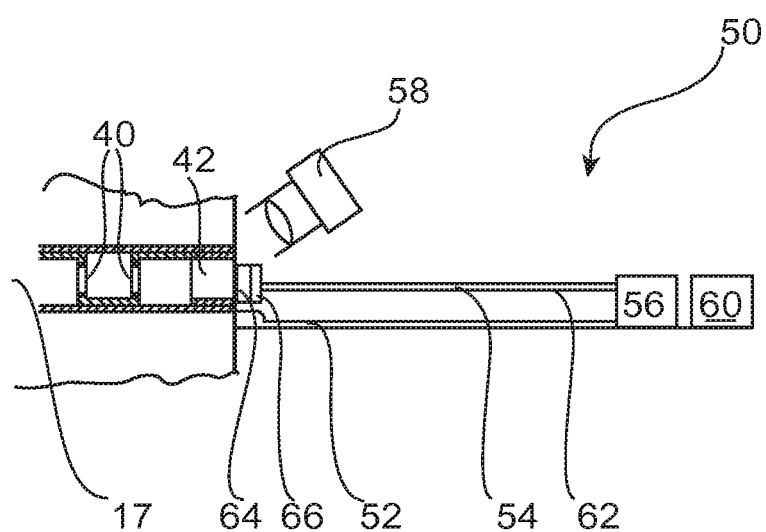
FIG. 5 shows apparatus for removing at least one foil from a reactor block.

FIG. 5 shows apparatus 50 that may be used in order to remove an insert 20, 22 from the channel 16, 17 of a catalytic reactor 10. The apparatus 50 has a support 52, a pushing member 54, at least one actuator 56, a position sensor 58 and a controller 60.

The support 52 holds the various integers that make up the apparatus in the vicinity of the reactor from which inserts are to be removed. The support 52 illustrated has only one pushing member 54. However, it will be appreciated that more than one pushing member 54 can be mounted on a single support 52. This can provide an increase in efficiency in that a single support and controller 60 can be supplied enabling numerous inserts to be removed simultaneously.

The pushing member 54 is an elongate rod 62 with a substantially flat end face 64. The end face 64 may be larger than the cross section of the elongate rod 62. The end face 64 may be a resilient plastic member affixed to the rod 62. Between the end face 64 and the rod 62 there is a pressure sensor 66. This sensor 66 measures the pressure exerted by the pushing member 54. The data from the pressure sensor 66 is provided to the controller 60.

The pushing member 54 is moved into position by one or more actuators 56. The actuators 56 move the pushing member 54 relative to the reactor 10 so that the pushing member 54 can be inserted into a reaction channel to remove the catalyst insert therefrom. The actuators 56 move the pushing member 54 in two different planes, horizontally along the side of the reactor and vertically.

The actuators 56 are controlled by the controller 60. The controller 60 obtains data from the position sensor 58 indicative of the position of the pushing member 54. The position sensor 58 may be a camera, a video camera or other suitable optical sensor using laser or ultrasound technology. As a result of the data obtained from the position sensor 58 the controller 60 instructs the actuators 56 to move the pushing member 54 until it is aligned with the path defined by the aligned perforations 40 in the fins, and the corresponding holes 42 in the bar 18. When the pushing member 54 is suitably aligned it is pushed through the hole 42 and the perforations 40 into the channel 17 to push the catalyst insert 22 out of the reactor 10.

It will be appreciated that the reactors described above are by way of example only, and that they may be modified in several ways while remaining within the scope of the present invention. In particular it will be appreciated that the endothermic and exothermic reactions may be different reactions from those described above, and evidently the catalyst materials must be appropriate for the reaction that is to be performed.

The invention claimed is:

1. A compact catalytic reactor, the reactor defining a multiplicity of first and second flow channels arranged alternately, the first flow channels providing flow paths for reactants for an endothermic reaction and containing a removable fluid-permeable catalyst structure to catalyze the endothermic reaction, and the second flow channels providing flow paths for reactants for an exothermic reaction and containing a removable fluid-permeable catalyst structure to catalyze the exothermic reaction, wherein the first flow channels have a straight portion extending from one end face of the reactor and a linking portion that communicates between the end of the straight portion and at least one side face of the reactor, wherein the straight portion and the linking portion are defined at least in part by fin structures, and wherein the fin structures of the linking portion are perforated, so that there are perforations that define a path aligned with each straight portion, and means are provided at the end of the reactor to obstruct each such path.

2. A reactor as claimed in claim 1 wherein the second flow channels have a straight portion extending from the opposite end face of the reactor, and a linking portion that communicates between the end of the straight portion and at least one side face of the reactor, wherein the straight portion and the linking portion are defined by fin structures, and wherein the fin structures of the linking portion are perforated, so that there are perforations that define a path aligned with each straight portion; and wherein means are provided at the end of the reactor to obstruct each such path.

3. A reactor as claimed in claim 1 wherein the flow channels are defined by thin metal sheets that are castellated and stacked alternately with flat sheets.

4. A reactor as claimed in claim 1 wherein the means to obstruct the path is an end sealing bar.

5. A reactor as claimed in claim 1 wherein the means to obstruct the path is a sealing strip attached to the outside of the reactor.

6. A reactor as claimed in claim 1 wherein the height of each perforation is at least 75% of the height of the fin structure.

7. A reactor as claimed in claim 6 wherein the height of each perforation is greater than its width.

8. A method of removing catalyst inserts from a catalytic reactor as claimed in claim 1, the method comprising removing the obstructions from the paths defined by the perforations and inserting a plunger along the path to push the catalyst inserts out.

9. A reactor as claimed in claim 2 wherein the flow channels are defined by thin metal sheets that are castellated and stacked alternately with flat sheets.

10. A reactor as claimed in claim 2 wherein the means to obstruct the path through the second flow channels is an end sealing bar.

11. A reactor as claimed in claim 2 wherein the means to obstruct the path through the second flow channels is a sealing strip attached to the outside of the reactor.

12. A reactor as claimed in claim 2 wherein the height of each perforation defining a path aligned with the straight portion of the flow channels is at least 75% of the height of the fin structure.

13. A reactor as claimed in claim 12 wherein the height of each perforation is greater than its width.

14. A compact catalytic reactor, the reactor comprising a multiplicity of first and second flow channels arranged alternately, wherein the first flow channels provide flow paths for reactants for an endothermic reaction and contain a removable fluid-permeable catalyst structure to catalyze the endothermic reaction, and wherein the second flow channels provide flow paths for reactants for an exothermic reaction and contain a removable fluid-permeable catalyst structure to catalyze the exothermic reaction, wherein the first flow channels have a straight portion extending from one end face of the reactor and a linking portion that communicates between the end of the straight portion and at least one side face of the reactor, and wherein the second flow channels have a straight portion extending from the opposite end face of the reactor, and a linking portion that communicates between the end of the straight portion and at least one side face of the reactor.

15. A reactor as claimed in claim 12 wherein both the first flow channels and the second flow channels are defined by thin metal sheets that are castellated and stacked alternately with flat sheets.

* * * * *